US008261002B2

(12) United States Patent
So et al.

(10) Patent No.: US 8,261,002 B2
(45) Date of Patent: Sep. 4, 2012

(54) PHY-LESS ULPI AND UTMI BRIDGES

(75) Inventors: Eric So, Markham (CA); Stephen U. Yao, Markham (CA); Alan Shiu Lung Tsun, Markham (CA)

(73) Assignee: QuickLogic Corporation, Sunnyvale, CA (US)

( * ) Notice: Subject to any disclaimer, the term of this patent is extended or adjusted under 35 U.S.C. 154(b) by 430 days.

(21) Appl. No.: 12/198,200

(22) Filed: Aug. 26, 2008

(65) Prior Publication Data

US 2009/0070515 A1    Mar. 12, 2009

Related U.S. Application Data

(60) Provisional application No. 60/971,501, filed on Sep. 11, 2007.

(51) Int. Cl.
*G06F 13/36* (2006.01)
*G06F 3/00* (2006.01)
*G06F 15/16* (2006.01)
*H04J 3/16* (2006.01)

(52) U.S. Cl. ......... 710/311; 370/470; 709/466; 710/11

(58) Field of Classification Search ............. 710/311, 710/11; 709/466; 370/470
See application file for complete search history.

(56) References Cited

U.S. PATENT DOCUMENTS

| | | | | |
|---|---|---|---|---|
| 5,844,903 A * | 12/1998 | Terashita et al. | ............. | 370/403 |
| 6,279,060 B1 * | 8/2001 | Luke et al. | ............. | 710/64 |
| 6,370,603 B1 * | 4/2002 | Silverman et al. | ............. | 710/72 |
| 6,766,406 B1 * | 7/2004 | Gasperini et al. | ............. | 710/315 |
| 7,406,118 B2 * | 7/2008 | Groen et al. | ............. | 375/219 |
| 7,464,192 B2 * | 12/2008 | Barnett et al. | ............. | 710/11 |
| 7,484,018 B2 * | 1/2009 | Szabelski | ............. | 710/60 |
| 7,565,455 B2 * | 7/2009 | He et al. | ............. | 709/250 |
| 2002/0029303 A1 * | 3/2002 | Nguyen | ............. | 709/327 |
| 2007/0076748 A1 * | 4/2007 | Nakagawa | ............. | 370/463 |
| 2007/0299650 A1 * | 12/2007 | Tamayo et al. | ............. | 703/27 |
| 2008/0013569 A1 * | 1/2008 | Boren | ............. | 370/466 |
| 2009/0268743 A1 * | 10/2009 | Chang et al. | ............. | 370/401 |
| 2010/0085983 A1 * | 4/2010 | Antonucci | ............. | 370/466 |

OTHER PUBLICATIONS

QuickLogic, QuickLogic's PHY-Less ULPI Chip-to-Chip Connectivity Solution, May 2007.*
Intel, USB2.0 Transceiver Marcocell UTMI Specification, Mar. 29, 2001, version 1.05.*
Intel, USB2.o Transceiver Macrocell, 2001, pp. 9-27.*

(Continued)

*Primary Examiner* — Paul R Myers
*Assistant Examiner* — Christopher A Daley
(74) *Attorney, Agent, or Firm* — Silicon Valley Patent Group LLP

(57) ABSTRACT

Embodiments of the present invention provide a unique capability of implementing a pair of pseudo-PHY interfaces using a bridge. From the host and device perspectives, the host and device communicate through a PHY interface. The bridge, however, avoids actually using a USB PHY interface. This PHY-less bridge allows communication between a host and a device at high speeds without high-power transceivers associated with a USB PHY interface. In accordance with the present invention, a host and a device may be coupled together using a PHY-less bridge using the same interface or translating between different interfaces by using a wrapper. Such PHY-less bridges include a UTMI-to-UTMI bridge, a UTMI-to-ULPI bridge, a ULPI-to-UTMI bridge and a ULPI-to-ULPI bridge, each avoiding the need for a USB PHY interface.

19 Claims, 14 Drawing Sheets

OTHER PUBLICATIONS

Buckley et al, Emulation of Multiple EDGE Physical Layers Using a Reconfigurable Radio Platform, 2002.*

Freescale Semiconductor, Can-to-USB Bridge, Jun. 2008, Freescale Semiconductor.*

"ArcticLink Solution Platform Brief: Programmable Connectivity Solution Platform" Rev. 2, Mar. 19, 2008 by QuickLogic in Sunnyvale, CA (4 pages).

"QuickLogic White Paper: Customer-Specific Standard Products Ease Mobile Device Design" Rev. E, Apr. 15, 2009 by QuickLogic in Sunnyvale, CA (8 pages).

"QuickLogic White Paper: Increasing Boot Options with Managed NAND" Rev. E, Jan. 21, 2009 by QuickLogic in Sunnyvale, CA (8 pages).

"QuickLogic Companion Solutions Guide: For the Marvell PXA Application and Communication Processor Families" Rev. 2, Jun. 2, 2008 by QuickLogic in Sunnyvale, CA (2 pages).

"QuickLogic's Solution Guide for PHY-less ULPI: QuickLogic's PHY-less ULPI Chip-to-Chip Connectivity Solution" Rev. A, May 25, 2007 by QuickLogic in Sunnyvale, CA (2 pages).

"QuickLogic Application Note 92: Clock Networks in the ArcticLink Solution Platform" Rev. D, Apr. 15, 2009 by QuickLogic in Sunnyvale, CA (13 pages).

"QuickLogic Application Note 92: Creating Power-Efficient Designs with the ArcticLink™ Solution Platform" Rev. C, Nov. 24, 2008 by QuickLogic in Sunnyvale, CA (20 pages).

"QuickLogic Application Note 93: USB 2.0 PCB Guidelines for the ArcticLink Solution Platform" Rev. C, Apr. 15, 2009 by QuickLogic in Sunnyvale, CA (7 pages).

"ArcticLink Device Data Sheet: Programmable Solution Platform Including Hi-Speed Universal Serial Bus (USB) 2.0 On-The-Go (OTG) and SD/SDIO/MMC/CE-ATA" Rev. J, Apr. 10, 2009 by QuickLogic in Sunnyvale, CA (56 pages).

"ArcticLink Solution Platform Data Sheet: Programmable Solution Platform Including Hi-Speed Universal Serial Bus (USB) 2.0 On-The-Go (OTG) and SD/SDIO/MMC/CE-ATA" Rev. L, Apr. 10, 2009 by QuickLogic in Sunnyvale, CA (46 pages).

"QuickLogic Reliability Report 2009" Rev. A, Jul. 23, 2009 by QuickLogic in Sunnyvale, CA (10 pages).

"ArcticLink Solution Platform Errata: Programmable Solution Platform Including Hi-Speed Universal Serial Bus (USB) 2.0 On-The-Go (OTG) and SD/SDIO/MMC/CE-ATA" Rev. F, Feb. 19, 2010 by QuickLogic in Sunnyvale, CA (5 pages).

"ArcticLink: Documents" downloaded from http://www.quicklogic.com/arcticlink-documents/ on Mar. 18, 2010 by QuickLogic in Sunnyvale, CA (2 pages).

"ArcticLink Solution Platform" downloaded from http://www.quicklogic.com/ on Jul. 24, 2007 by QuickLogic in Sunnyvale, CA (5 pages).

"QuickLogic ArcticLink Solution Platform Brief: Programmable Connectivity Solution Platform" V2, Mar. 2008 by QuickLogic in Sunnyvale, CA (4 pages).

"QuickLogic Clock Networks in the ArcticLink Solution Platform: QuickLogic Application Note 92" Rev. D, Apr. 2009 (Rev A, Apr. 2007) by QuickLogic in Sunnyvale, CA (13 pages).

"QuickLogic USB 2.0 PCB Guidelines for the ArcticLink Solution Platform: QuickLogic Application Note 93" Rev. C, Apr. 2008 (Rev A, Apr. 2007) by QuickLogic in Sunnyvale, CA (7 pages).

"QuickLogicCreating Power-Efficient Designs with the ArcticLink Solution Platform: QuickLogic® Application Note 94" Rev. C, Nov. 2008 (Rev A, May 2007) by QuickLogic in Sunnyvale, CA (20 pages).

"QuickLogic Creating Power-Efficient Designs with the ArcticLink Solution Platform: QuickLogic Application Note 94" Rev. C, Nov. 2008 (Rev A, May 2007) by QuickLogic in Sunnyvale, CA (20 pages).

* cited by examiner

PHY-LESS ULPI AND UTMI BRIDGES

CROSS-REFERENCE TO RELATED APPLICATIONS

This application claims the benefit under 35 U.S.C. 119(e) from U.S. Provisional Application No. 60/971,501, filed Sep. 11, 2007, which is incorporated herein by reference.

BACKGROUND OF THE INVENTION

1. Field of the Invention

The invention relates generally to USB bridges and more specifically to PHY-less ULPI and UTMI bridges.

2. Background of the Invention

A traditional interface between two USB (universal serial bus) devices uses a complete mixed-signal physical (PHY) layer, which often includes more than 50 parallel electrical connections, such as defined by the USB 2.0 UTMI (Universal Transceiver Macrocell Interface) standard. An enhanced UTMI+standard builds on the UTMI standard to add support for a HS OTG (Hi-Speed USB 2.0 On-The-Go) PHY interface. The UTMI/UTMI+ standards allow a USB peripheral and a host to communicate data at high speeds, however, using the large number of physical electrical connections. One solution to reduce the number of electrical connections in the USB PHY interface is defined in the ULPI (UTMI+ Low Pin Interface) standard. This ULPI standard builds on the earlier UTMI+PHY interface standard and reduces the interface count to 8 to 12 connections, however adds latency to communication between the USB device and USB host.

As the USB standard becomes more ubiquitous, system designers have also adopted chip-to-chip interconnection of these USB devices. Traditionally, for two USB devices to communicate with each other at the chip level, each requires a PHY interface port: a first interface port for upstream data to the host; and a second interface port for downstream data to the device. This PHY interface logic contains both digital processing logic and power consuming analog transceivers. PHY interfaces running at high-speeds may consume over 50 mA (milli Amperes) of power.

Designs requiring a PHY interface on each side of the host-to-device connection may be expensive, consume a high amount of power during operation, complex and require excess board space. Therefore, a need exists with ULPI systems to significantly reduce the interface signals to approximately 8 to 12 pins, reduce latency and potentially reduce system cost, routing complexity and used board space.

SUMMARY

Some embodiments of the present invention provide a unique capability of implementing a pair of pseudo-PHY interfaces using a bridge. From the host and device perspectives, the host and device communicate through a PHY interface. The bridge, however, avoids actually using a USB PHY interface. This PHY-less bridge allows communication between a host and a device at high speeds without high-power transceivers associated with a USB PHY interface. In accordance with the present invention, a host and a device may be coupled together using a PHY-less bridge using the same interface or translating between different interfaces by using a wrapper. Such PHY-less bridges include a UTMI-to-UTMI bridge, a UTMI-to-ULPI bridge, a ULPI-to-UTMI bridge and a ULPI-to-ULPI bridge, each avoiding the need for a USB PHY interface. For example, a PHY-less UTMI-to-UTMI bridge enables communication between a UTMI host (upstream) link and a UTMI device (downstream) link at high-speeds without using high power transceivers. Such bridges may be useful in UTMI hubs and may allow the addition of multi-port capabilities.

Some embodiments of the present invention provide for a programmable logic device comprising: a bridge to operate between a first USB unit and a second USB unit, wherein the bridge is configurable to emulate a physical layer between the first USB unit and the second USB unit; programmable logic; a first physical interface coupled, via the programmable logic, to the first USB unit to the bridge; and a second physical interface coupled, via the programmable logic, to the second USB unit to the bridge.

Some embodiments of the present invention provide for a programmable logic device comprising: bridging means for operating between a first USB unit and a second USB unit; and emulating a physical layer between the first USB unit and the second USB unit; programmable logic means for coupling circuitry together; a first interface means for coupling, via the programmable logic means, to the first USB unit to the bridge; and a second interface means for coupling, via the programmable logic means, to the second USB unit to the bridge.

Some embodiments of the present invention provide for a method in a programmable logic device, the method comprising: providing a bridge, providing programmable logic; providing a first USB unit; providing a second USB unit; programming the programmable logic to electrically couple the first USB unit to the bridge; and programming the programmable logic to electrically couple the second USB unit to the bridge.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

Figure 1:
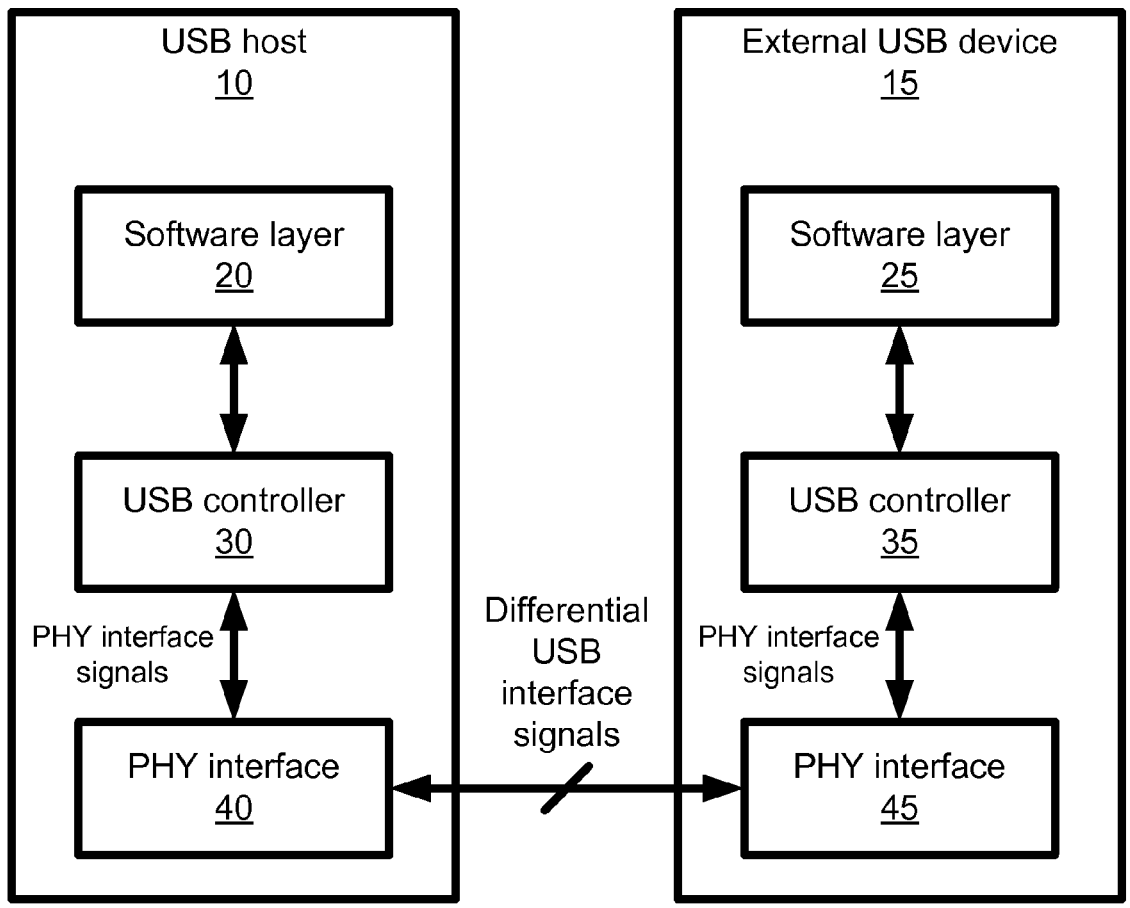
FIG. 1 shows a USB host connected by a differential USB interface to an external USB device.

FIG. 1 shows a USB host 10 connected by a differential USB interface to an external USB device 15. Typically, an external USB device 15 is user detachable from a USB host 10 such as with a USB flash drive device, USB hard disk drive device or USB Bluetooth device. The USB host 10 includes a software layer 20, a USB controller 30 and a PHY interface 40. The external USB device 15 also includes a software layer 25, a USB controller 35 and a PHY interface 45. The software layers 20 and 25 represent user programmable logic, which may be implemented in user programmable software or user configurable hardware. The software layers 20 and 25 may communicate to the USB controllers 30 and 35 via standard driver calls. The software layers 20 and 25 and the USB controllers 30 and 35 are shown as separate blocks to allow for more portable user programming of the software layers 20 and 25. In turn, the USB controllers 30 and 35 communicate with the lower level PHY interfaces 40 and 45 using PHY interface signals. At the lowest level, the two PHY interfaces 40 and 45 communicate to one another using differential USB interface signals, each requiring a high-power transceiver (if bi-directional) or a high-power transmitter (if unidirectional).

Figure 2A:
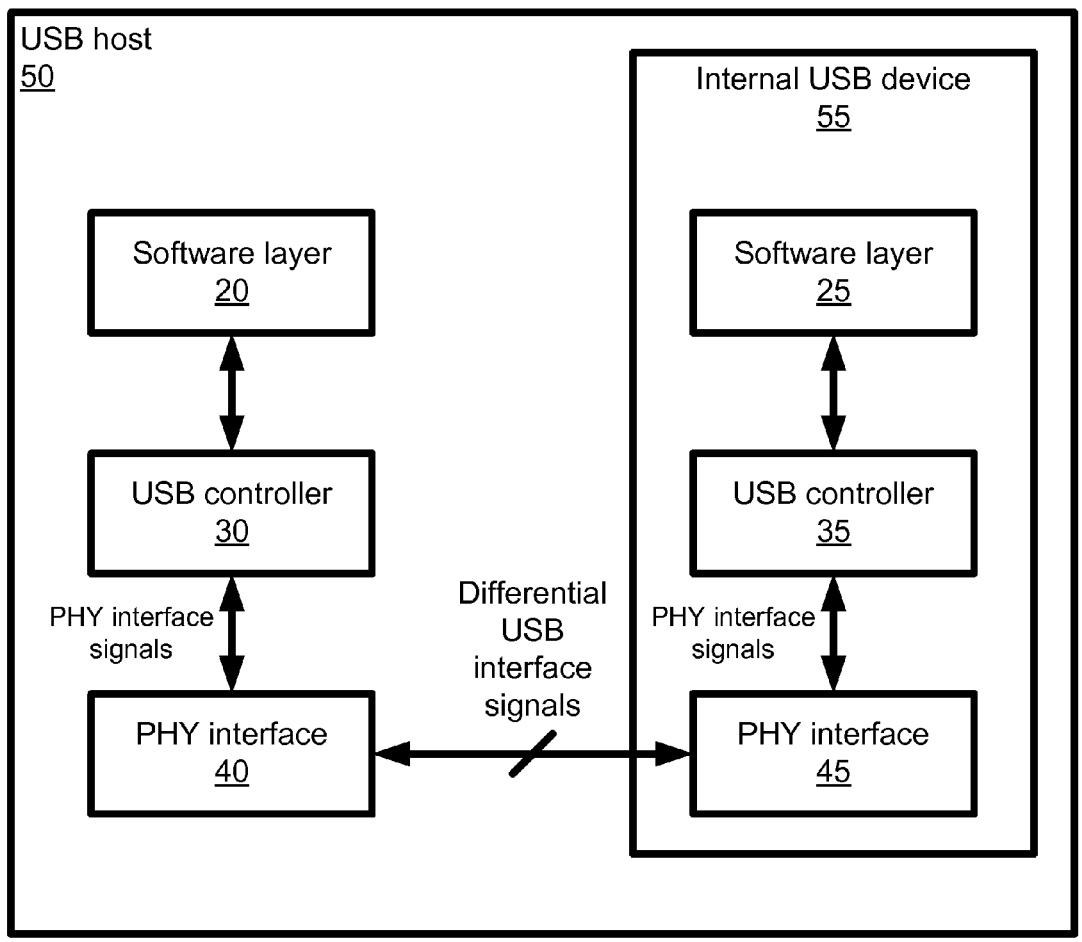
FIGS. 2A, 2B and 2C show a USB host connected by a differential USB interface to an internal USB device.
Figure 2B:
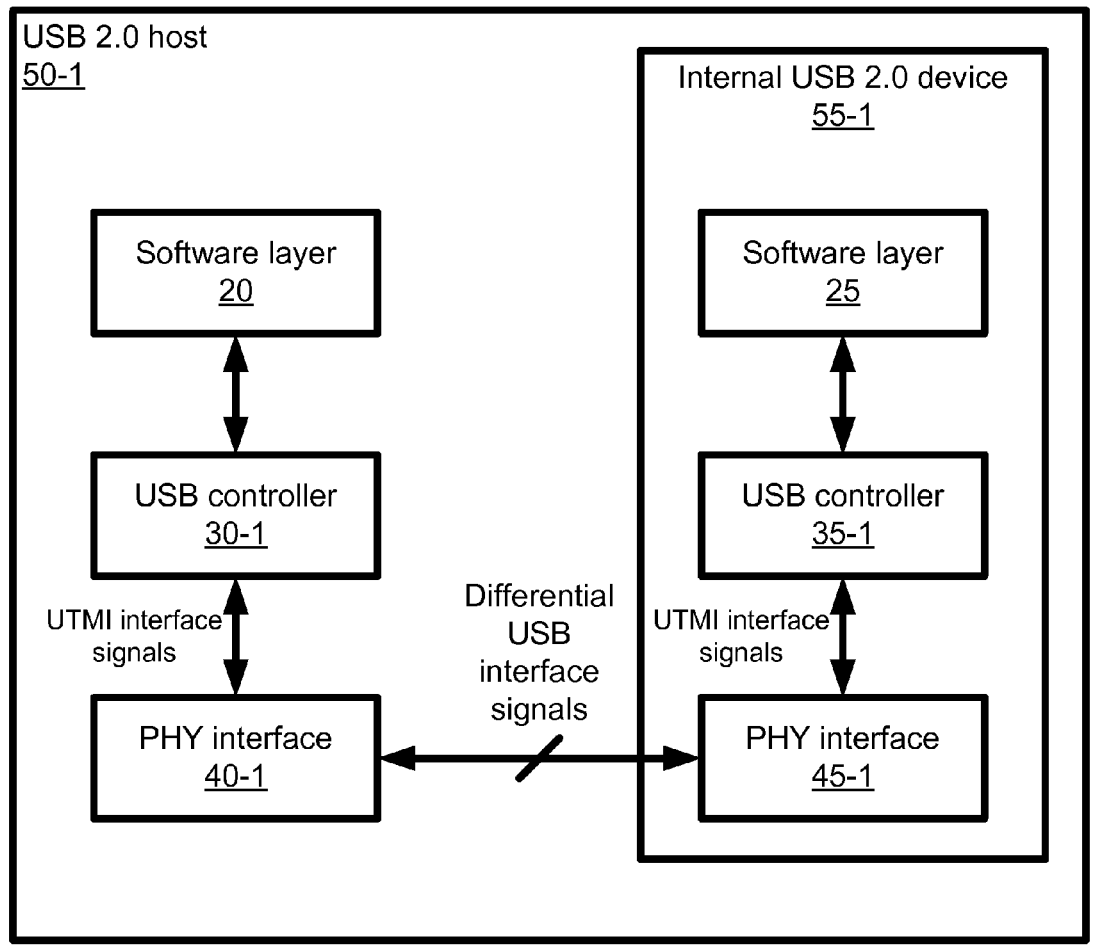
Figure 2C:
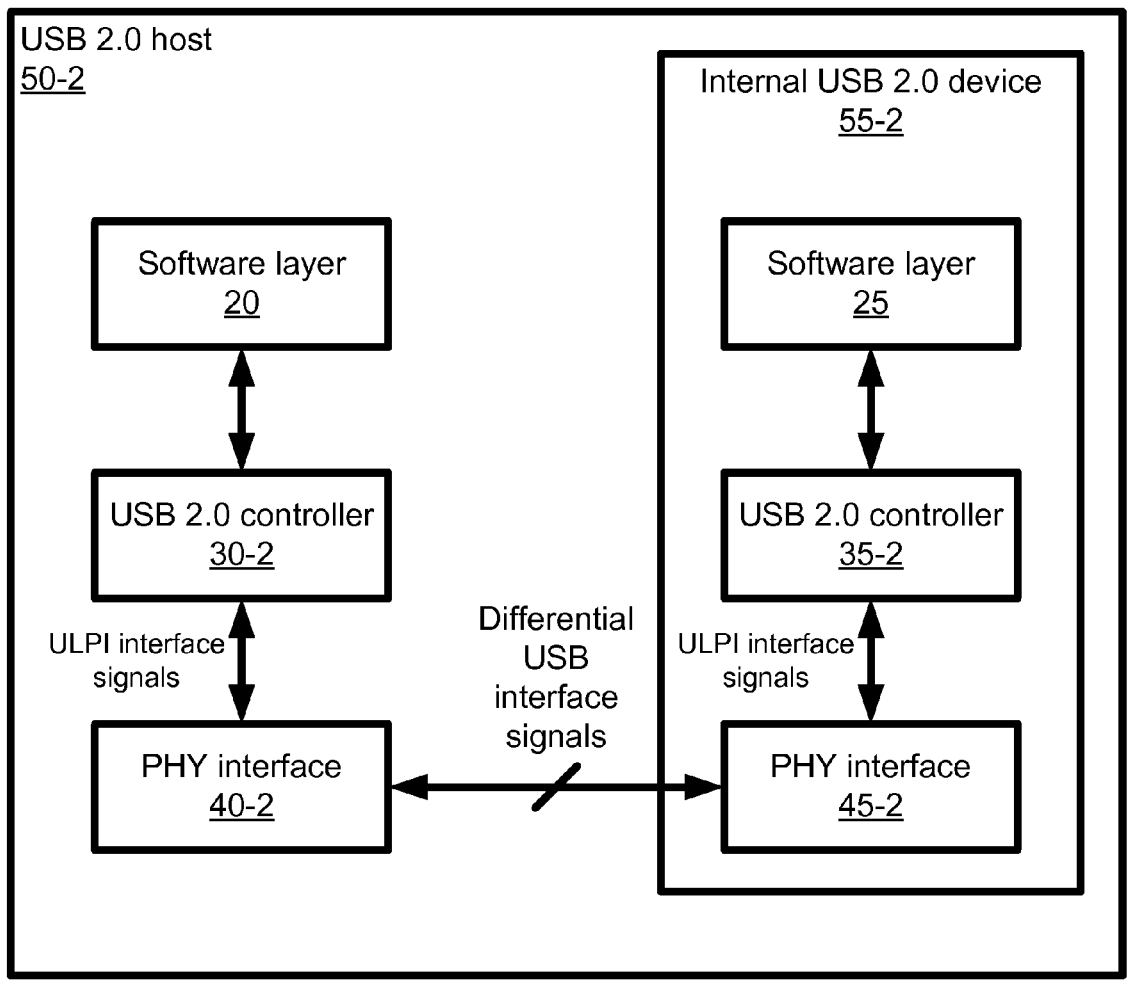

FIGS. 2A, 2B and 2C show a USB host 50 connected by a differential USB interface to an internal USB device 55. An internal USB device 15, such as a USB hard disk drive device or USB Bluetooth device, may be permanently designed into a USB host 50.

In FIG. 2A, the USB host 10 and internal USB device 55 similarly include a respective software layer 20 and 25, a respective USB controller 30 and 35, and a respective PHY interface 40 and 45. The internal configuration of FIG. 2A is identical to the external configuration of FIG. 1 except that the interface signals are hard wired and not user detachable in the internal configuration.

In FIG. 2B, UTMI interface signals are used. A USB 2.0 host 50-1 includes a software layer 20, a USB controller 30-1 and a PHY interface 40-1. An internal USB 2.0 device 55-1 includes a software layer 25, a USB controller 35-1 and a PHY interface 45-1. The generic PHY interface signal of FIG. 2B are shown as UTMI interface signals between the respective USB controllers 30-1 and 35-1, and the respective PHY interfaces 40-1 and 45-1. As before, the PHY interfaces 40-1 and 45-1 communicate with each other using differential USB interface signals.

FIG. 2C shows another variation using ULPI interface signals. A USB 2.0 host 50-2 includes a software layer 20, a USB controller 30-2 and a PHY interface 40-2. An internal USB 2.0 device 55-2 includes a software layer 25, a USB controller 35-2 and a PHY interface 45-2. In this case, UTMI interface signals are used to communicate between the host 50-2 USB controller 30-2 and PHY interface 40-2, and between the device 55-2 USB controller 35-2 and PHY interface 45-2. Once again, the PHY interfaces 40-2 and 45-2 communicate with each other using differential USB interface signals.

Figure 3A:
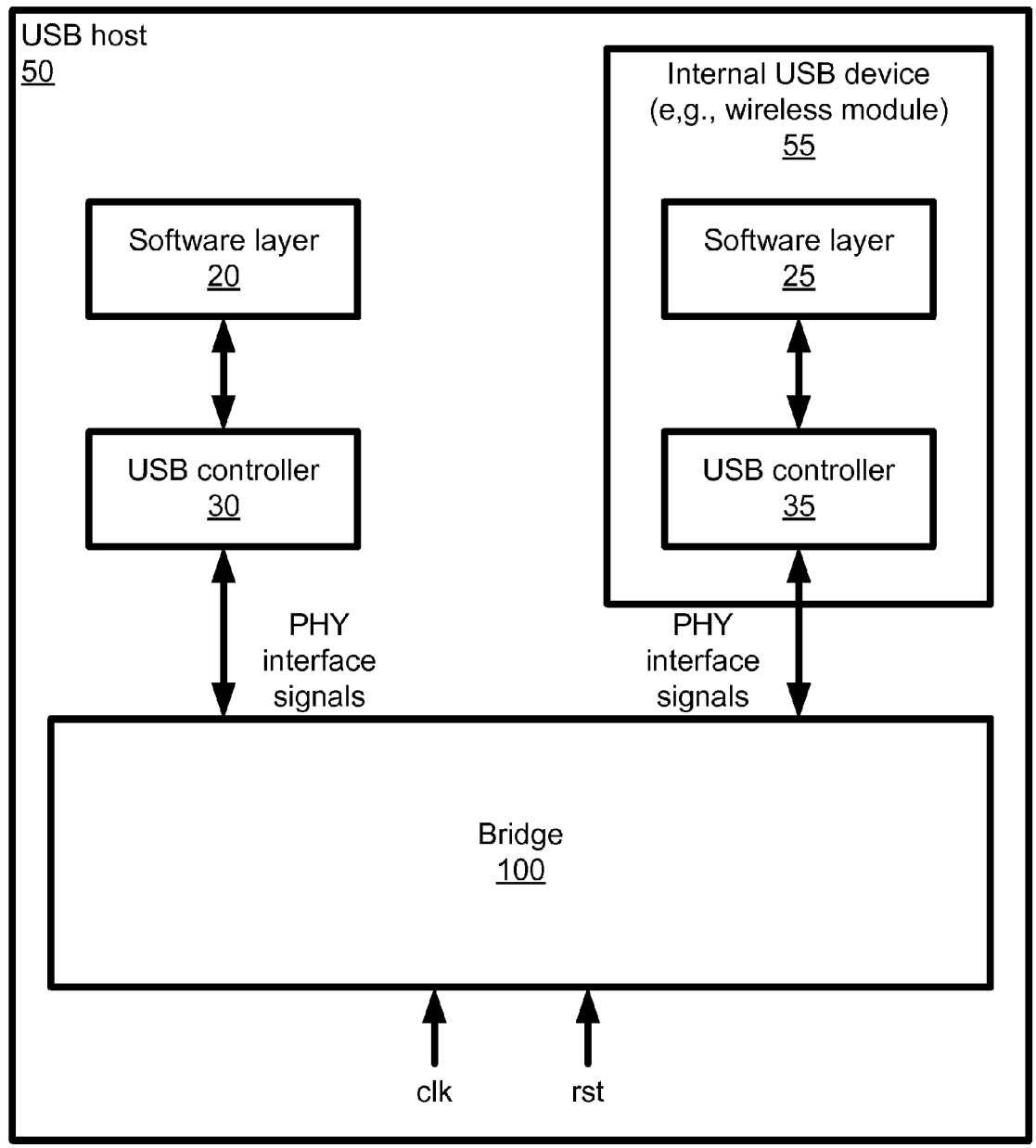
FIGS. 3A, 3B, 3C and 4 show a USB host connected by a bridge to an internal USB device, in accordance with embodiments of the current invention.

FIGS. 3A, 3B, 3C and 4 show a USB host connected by a bridge to an internal USB device, in accordance with embodiments of the current invention. FIG. 3A shows USB host 50 and an internal USB device 55, such as a wireless module (e.g., a USB Bluetooth or WiFi device). The USB host 50 and internal USB device 55 each contain a respective software layer 20 and 25 as well as a respective USB controller 30 and 35. The PHY interfaces 40 and 45 shown above have been removed and replaced with a bridge 100 that communicates in place of the PHY interfaces 40 and 45 using PHY interface signals. The bridge 100 emulates a PHY interface but does not use differential USB interface signals thus is a PHY-less bridge. The PHY-less bridge 100 includes USB transmit and receive functionality without actually translating digital signals into a differential pair of wires (D+/D−) as defined by the USB standard. Without the USB defined differential pair, data may still be communicated at high speeds but without the need for high-power transceivers. As such, the USB controllers 30 and 35 need not be specially configured to operate with the PHY-less bridge 100 and may be simply connected to the bridge 100 rather than the respective PHY interface modules 40 and 45. Such a PHY-less bridge is ideal for chip-to-chip interconnect in a mobile device. Some embodiments of a PHY-less bridge 100 are implemented using one or more state machines driven by UTMI signals. The PHY-less bridge 100 may also include registered transmit and receives data paths for timing considerations. The bridge 100 also includes an input port for a clock signal (clk) and an input port for a reset signal (rst). The clock signal allows the bridge to communicate with the USB host and USB device synchronously. The reset signal is used to put the bridge 100 in a known state, for example, during a power up sequence.

Figure 3B:
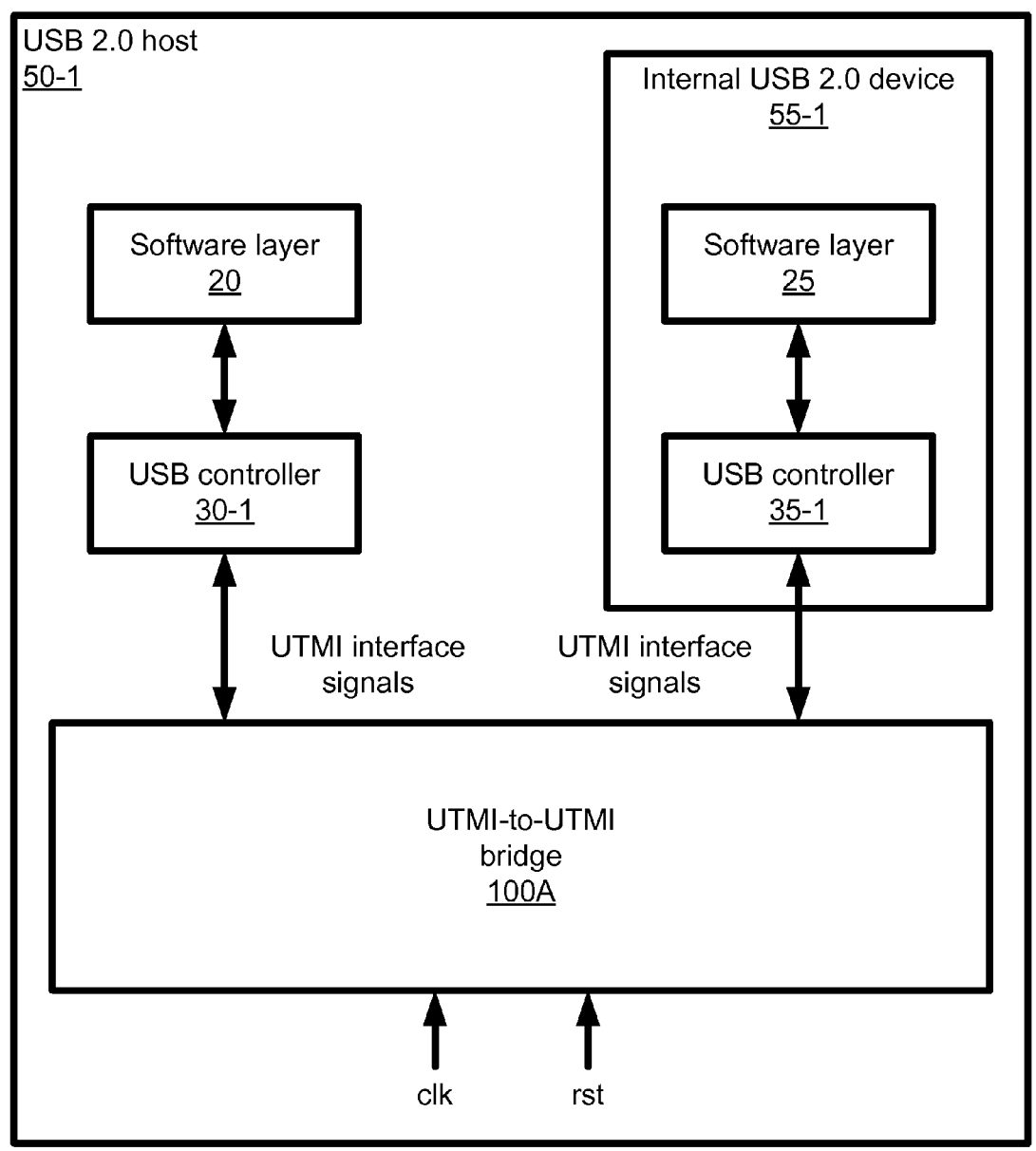
Figure 3C:
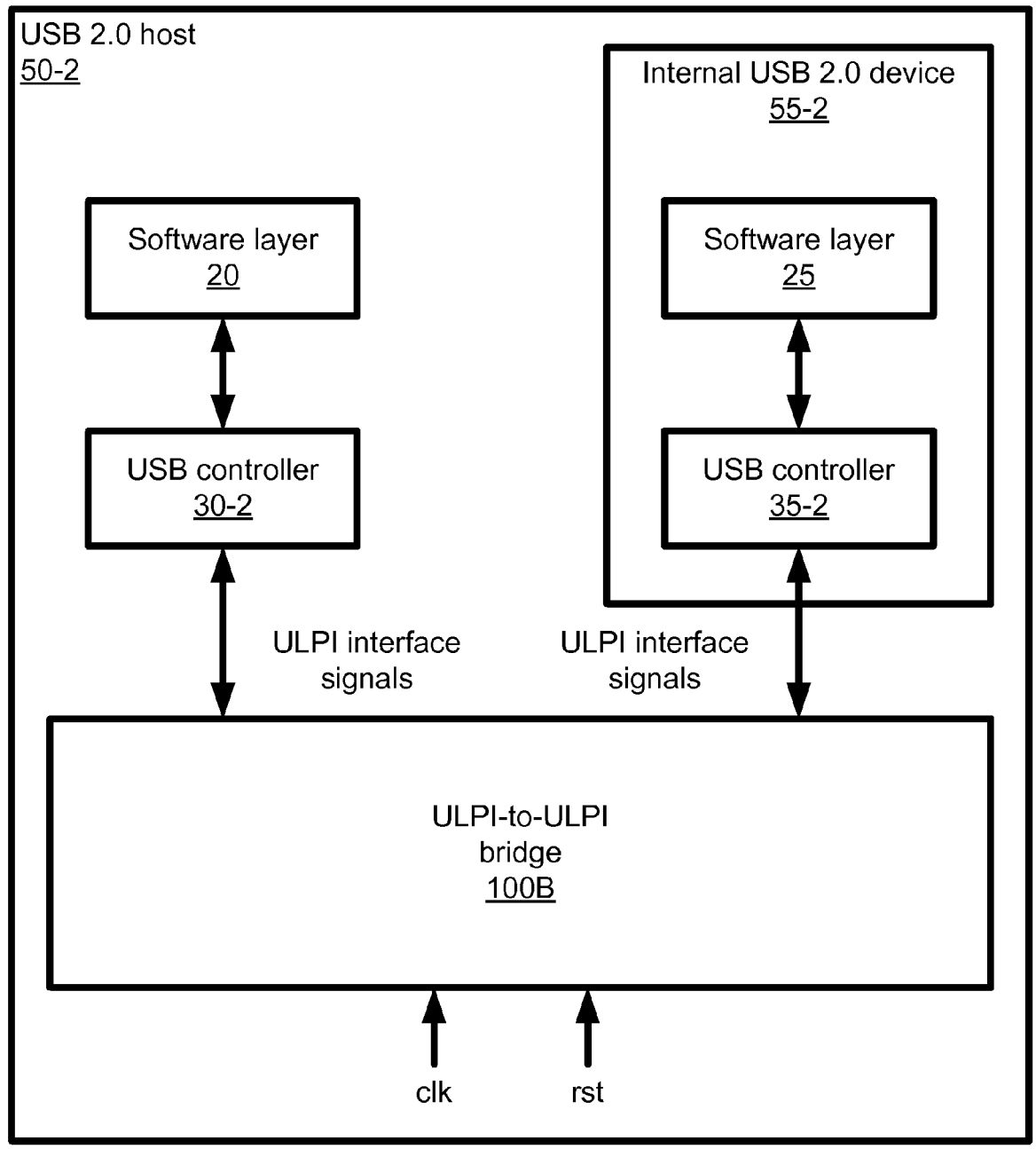

FIG. 3B shows a USB 2.0 host 50-1 and an internal USB 2.0 device 55-1 similar to the system shown in FIG. 3A, however, UTMI interface signals are bridged using a UTMI-to-UTMI bridge 100A without a PHY interface. The PHY-less bridge 100A communicates with a USB controller 30-1 in the host 50-1 using UTMI interface signals and communicates with USB controller 35-1 in the internal USB 2.0 device also using UTMI interface signals. Some systems may use ULPI interfaces rather than UTMI interfaces. In FIG. 3C a USB 2.0 host 50-2 and an internal USB 2.0 device 55-2 similar to the system shown in FIG. 3B use ULPI interface signals and a ULPI-to-ULPI bridge 100B rather than UTMI interface signals.

Figure 4:
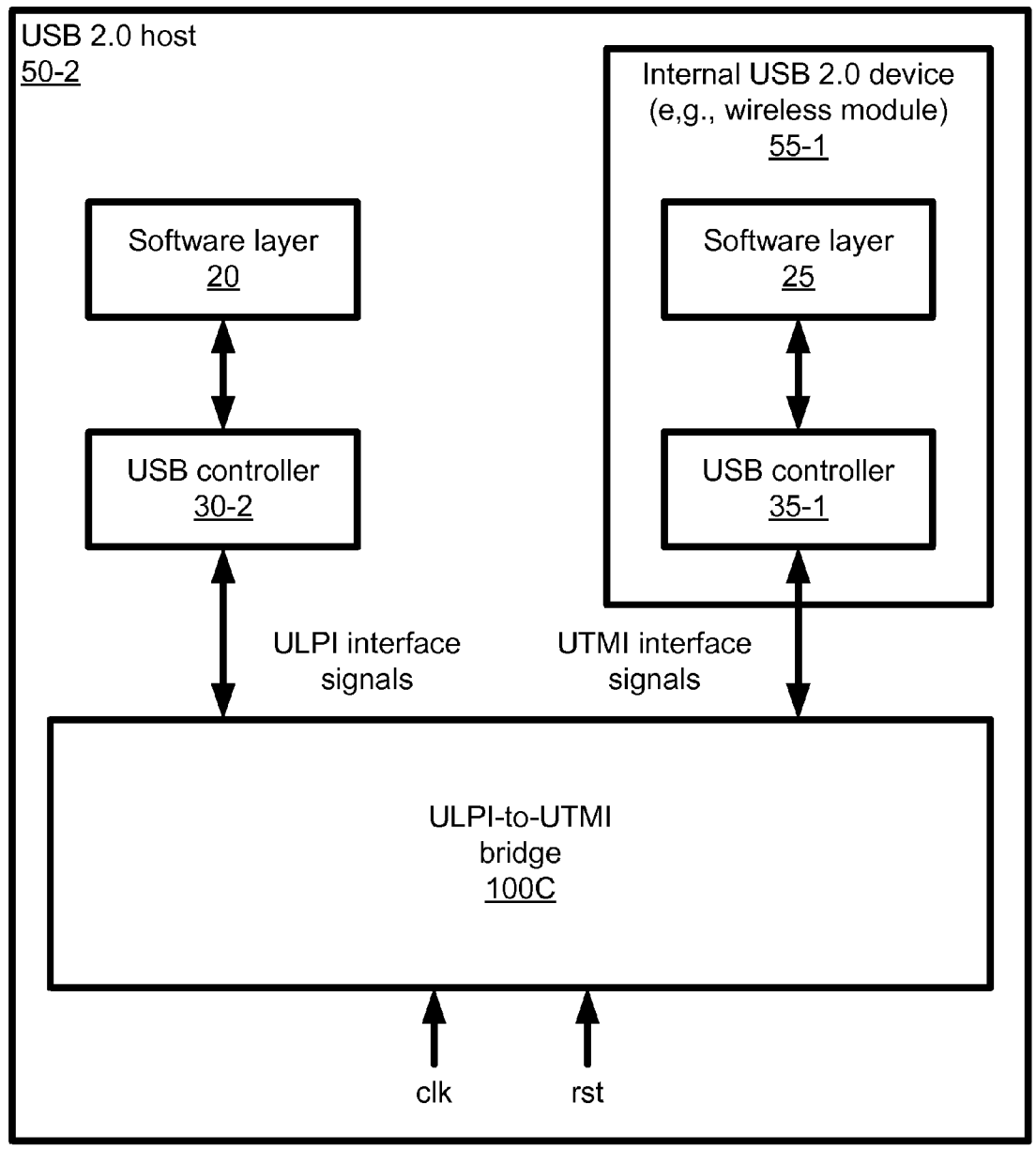

The embodiments shown above bridge similar signals (e.g., UTMI-to-UTMI, or ULPI-to-ULPI). A bridge may be designed to connect a USB host 50 to an internal USB device 55 where the host and device use different interface signal. In FIG. 4, a ULPI-to-UTMI bridge 100C connects a USB controller 30-2 (from FIG. 3C) in a USB 2.0 host 50-2 with a USB controller (from FIG. 3B) in an internal USB 2.0 device. Similarly, a UTMI-to-ULPI bridge (not shown) would connect a USB controller 30 (in a host 50) using UTMI interface signals with a USB controller 35 (in an internal device 55) using ULPI signals.

Figure 5A:
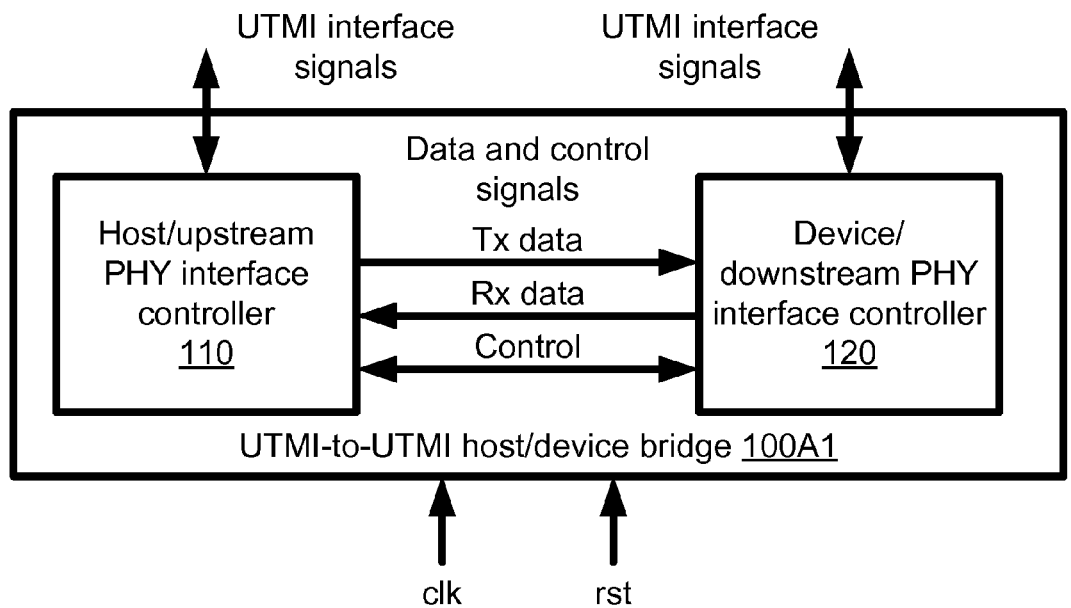
FIGS. 5A and 5B show UTMI-to-UTMI bridges, in accordance with embodiments of the present invention.
Figure 5B:
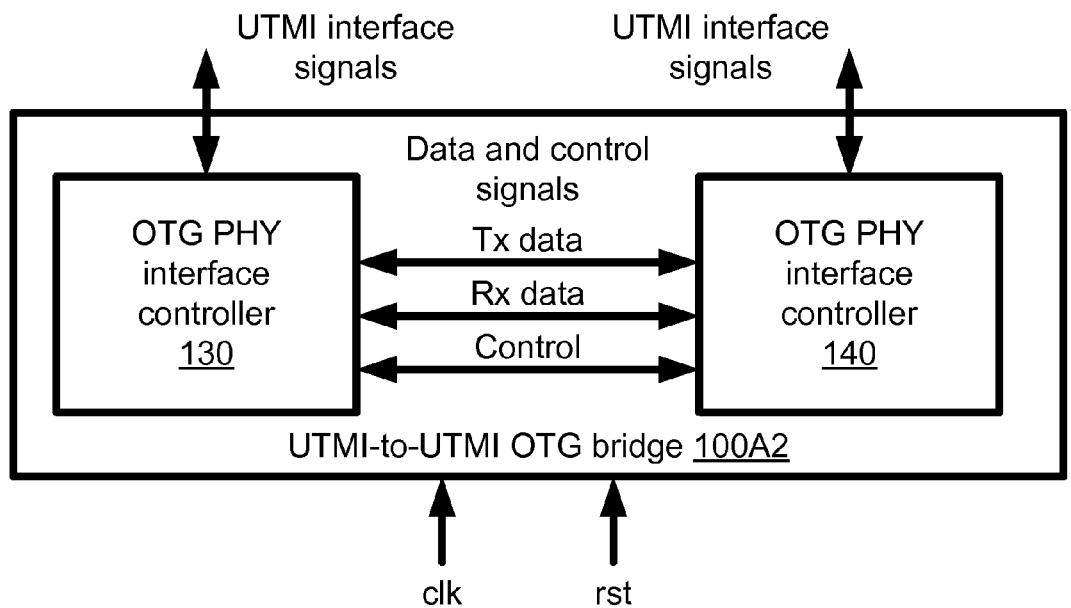

FIGS. 5A and 5B show UTMI-to-UTMI bridges 100, in accordance with embodiments of the present invention. FIG. 5A shows a UTMI-to-UTMI host/device bridge 100A1 including a host/upstream PHY interface controller 110 and a device/downstream PHY interface controller 120 connected with data and control signals. The data and control signals include a unidirectional transmit data line (Tx data), a unidirectional receive data line (Rx data), and a bi-direction control line (control). Bridge 100A1 may be used to replace the PHY interfaces 40-1 and 45-1 of FIG. 2B thereby providing a PHY-less UTMI bridge that eliminates power consuming transceivers and potentially reducing costs, occupied board space and complexity.

FIG. 5B shows a UTMI-to-UTMI host/device bridge 100A2 including a OTG (on-the-go) PHY interface controller 130 and a OTG PHY interface controller 140 connected with data and control signals. The data and control signals include a bi-directional transmit data line (Tx data), a bi-directional receive data line (Rx data), and a bi-direction control line (control). Similarly, bridge 100A2 may be used to replace the PHY interfaces 40-1 and 45-1 of FIG. 2B thereby providing a PHY-less UTMI OTG bridge.

Some system designs require various combinations of common and uncommon interfaces, such as between: (1) a UTMI host and a UTMI device (as shown in FIGS. 5A and 5B); (2) a ULPI host and a ULPI device; (3) a ULPI host and a UTMI device; and (4) a UTMI host and a ULPI device. A PHY-less bridge, such as PHY-less UTMI bridge 100A from FIGS. 5A and 5B, may be coupled one or more non-UTMI interfaces when used with a wrapper. One ULPI wrapper allows a PHY-less UTMI bridge to couple a ULPI host to a UTMI device or a UTMI device to a ULPI device. Two ULPI wrappers allows a PHY-less UTMI bridge to couple a ULPI host to a ULPI device.

Figure 6:
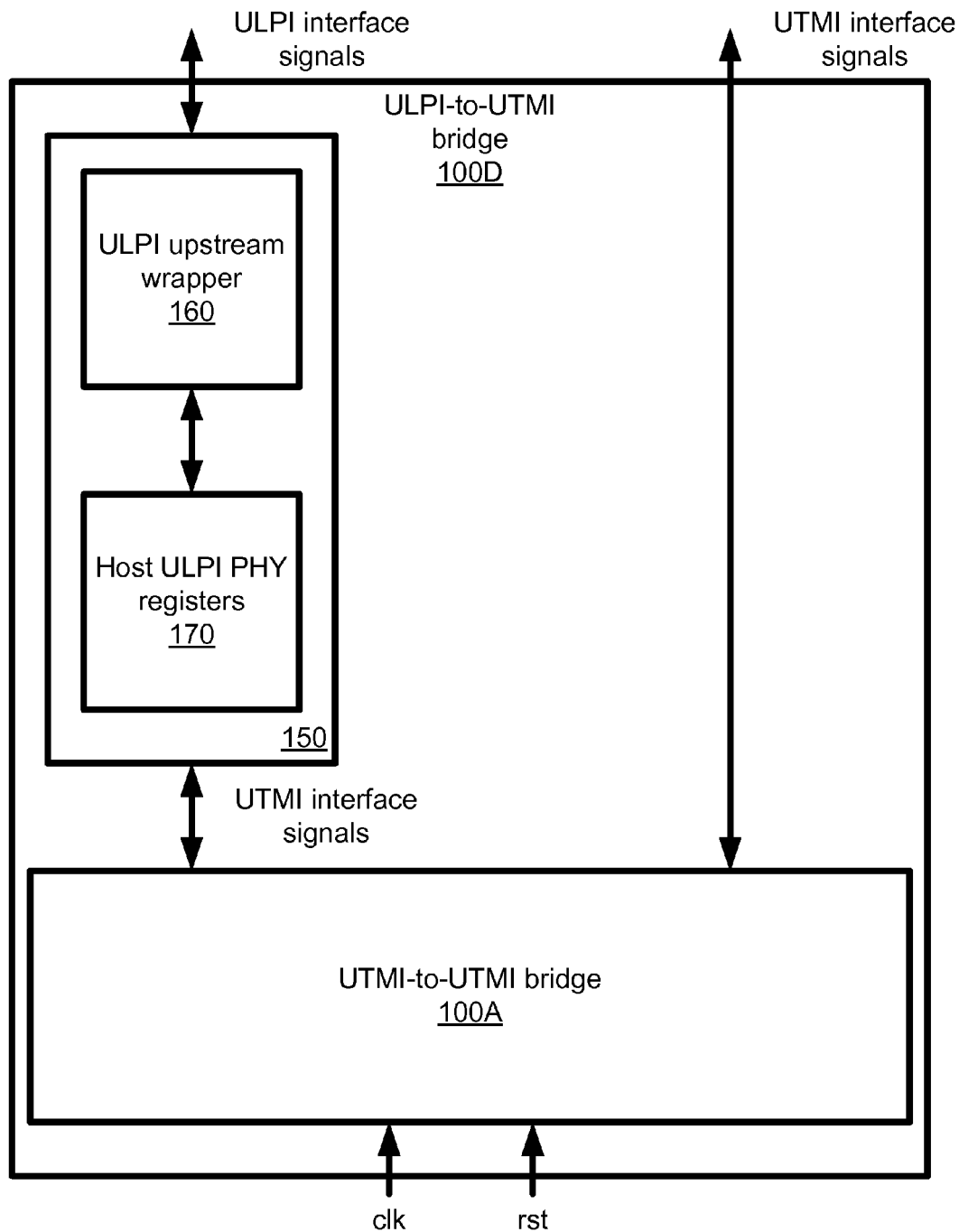
FIGS. 6, 7 and 8 show a UTMI-to-UTMI bridge in combination with one or more a ULPI wrappers, in accordance with embodiments of the present invention.
Figure 7:
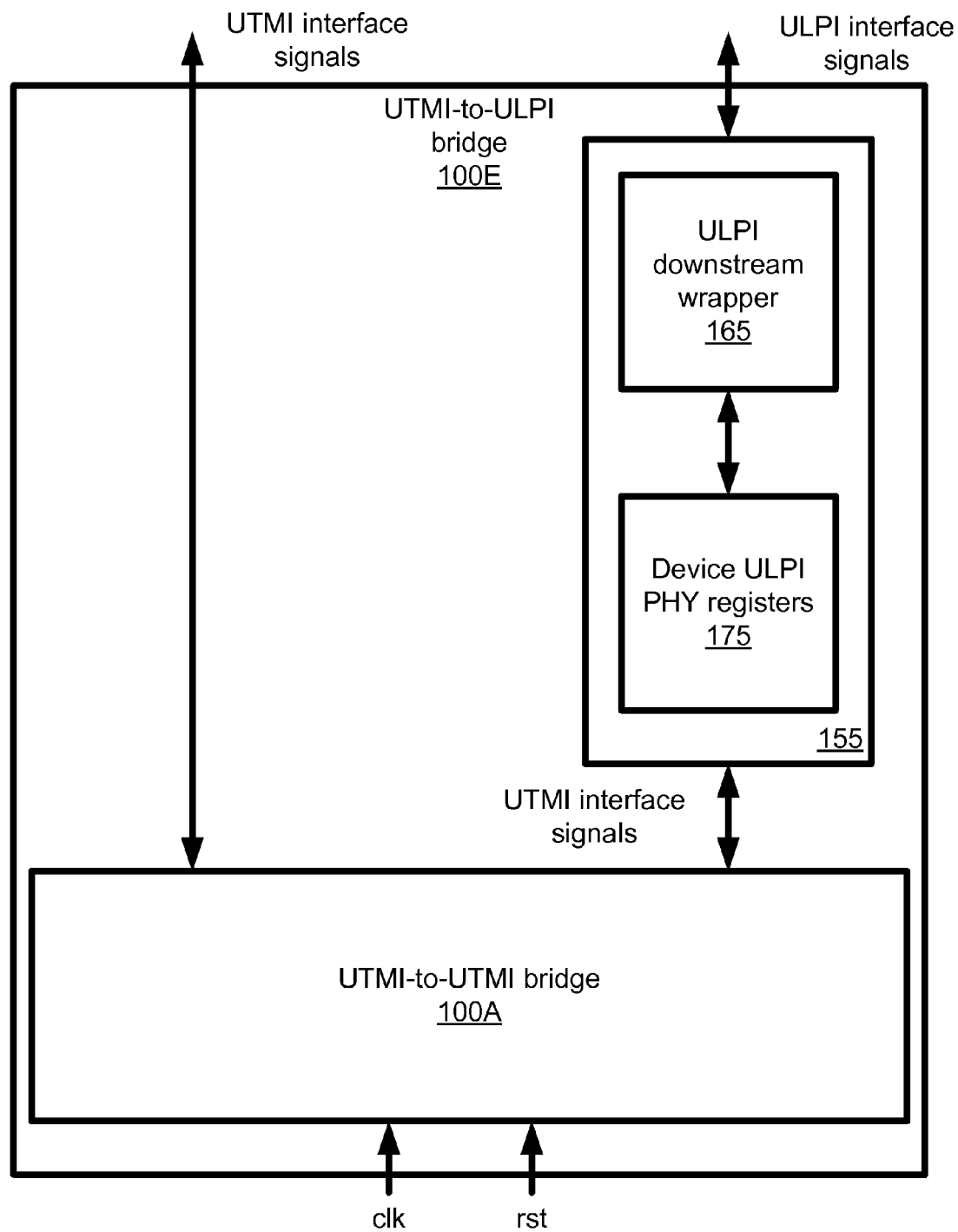
Figure 8:
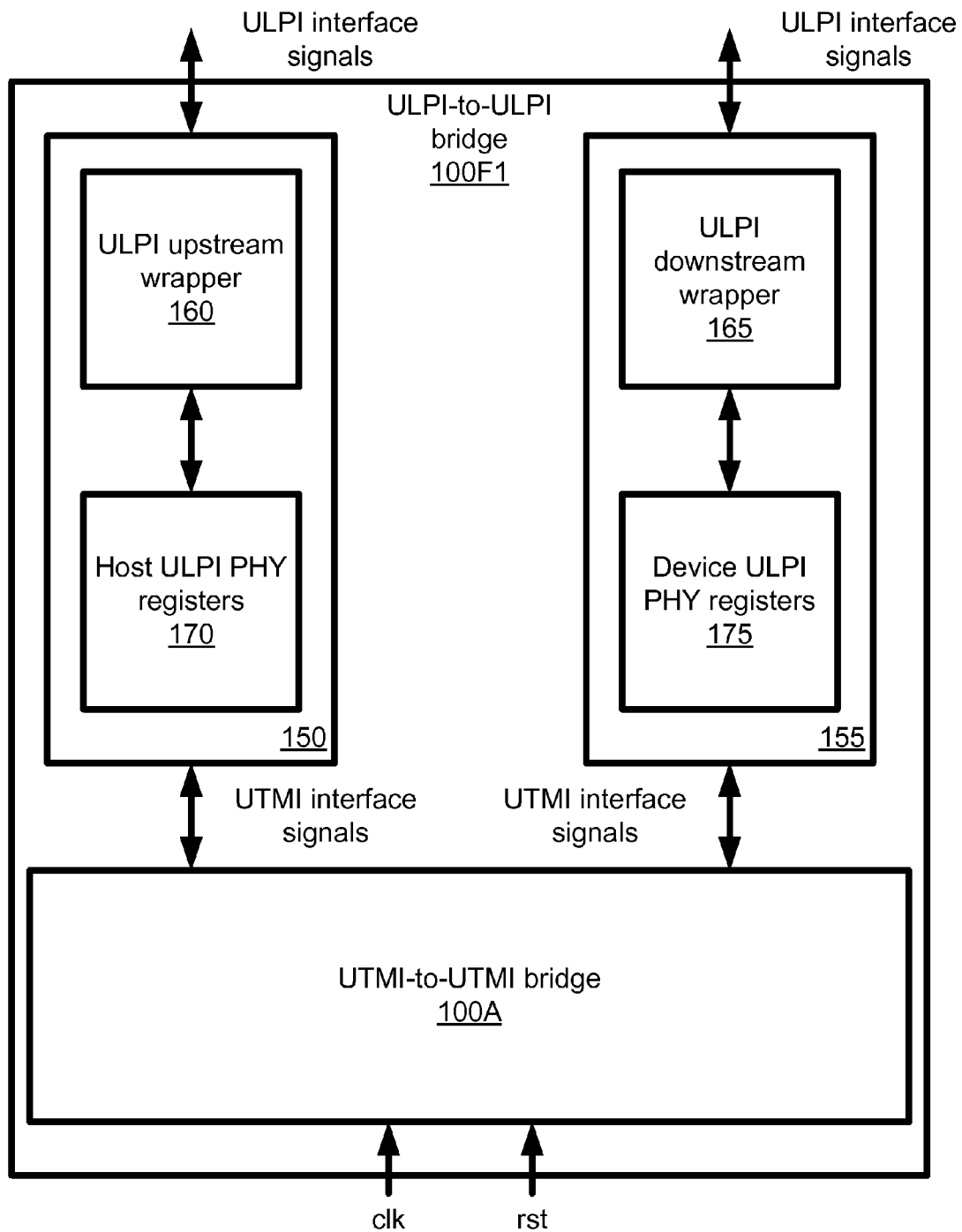

FIGS. 6, 7 and 8 show a UTMI-to-UTMI bridge in combination with one or more a ULPI wrappers, in accordance with embodiments of the present invention. The ULPI-to-ULPI bridge may include one or more state machines driven by post-translated ULPI protocol signals and emulated using internal ULPI PHY registers (and vice versa). For timing considerations, the transmit and receive data paths may also be registered. Such an implementation is adds complexity and may be more inefficient, for example, if one or two UTMI interfaces are required. One advantage of this implementation is the possible logic gate savings as RTL coding of bridge functions and ULPI protocol translations may be more closely tied. The possible disadvantage of this implementation is the inefficiencies of protocol or layer translation to UTMI (if required), as ULPI is protocol necessitated by the reduced pin version of UTMI (inherently UTMI already).

FIG. 6 shows a ULPI-to-UTMI bridge 100D, which couples a ULPI host to a UTMI device. The ULPI-to-UTMI bridge 100D includes a UTMI-TO-UTMI bridge 100A (e.g., 100A1 of FIG. 5A or 100A2 of FIG. 5B) and a ULPI upstream wrapper 150 accepting ULPI interface signals from a host's USB controller (e.g., USB controller 30-2 of FIG. 3C). Internally to the ULPI-to-UTMI bridge 100D, the UTMI-to-UTMI bridge 100A communicates UTMI interface signals to the ULPI wrapper 150. External to the ULPI-to-UTMI bridge 100D, the UTMI-to-UTMI bridge 100A communicates UTMI interface signals to a device's USB controller (e.g., USB controller 30-2 of FIG. 3B). The ULPI wrapper 150 includes a ULPI upstream wrapper 160 and a set of host ULPI PHY registers, which in combination are used to emulate a ULPI interface to a host.

FIG. 7 shows a UTMI-to-ULPI bridge 100E having a wrapper to emulate a ULPI interface to a device. The UTMI-to-ULPI bridge 100E includes a UTMI-to-UTMI bridge 100A and a ULPI wrapper 155 communicating using UTMI interface signals. A host communicates with the UTMI-to-UTMI bridge 100A using UTMI interface signals. A device communicates through a ULPI wrapper 155 using ULPI interface signals. The ULPI wrapper 155 includes an ULPI downstream wrapper 165 and a set of device ULPI PHY registers used to emulate the ULPI interface.

FIG. 8 shows a ULPI-to-ULPI bridge 100F1 having two wrappers and a bridge: a first wrapper 150 (describe above) for the upstream to the host; a second wrapper 155 (also describe above) for the downstream to the device; and a UTMI-to-UTMI bridge 100A. Each wrapper 150 and 155 emulates a ULPI interface as respectively seen by the host and the device. Such wrappers, however, introduce latency of multiple nanoseconds. Such unnecessary latency may be removed by a PHY-less ULPI bridge. The benefit of this bridge over a native ULPI bridge is the modular ease of use of a UTMI-to-UTMI bridge without a ULPI wrapper or with an optional one or two ULPI wrappers, which can be beneficial for re-use methodology purposes. Re-use methodologies can apply to re-use in the sense of variations of products, variations of multiple instantiations within the same product and the like.

In FIGS. 6, 7 and 8, the core bridge 100 is a UTMI-to-UTMI bridge with one ULPI wrappers on either end (or on both ends for ULPI-to-ULPI bridge). Each of these bridges also emulate actual PHY functionality, including: (1) ULPI PHY register read and write accesses; and (2) transmit and receive without actually having to go through D+/D− on the USB wires; which make these bridges ideal for chip-to-chip interconnect in a mobile device.

Figure 9:
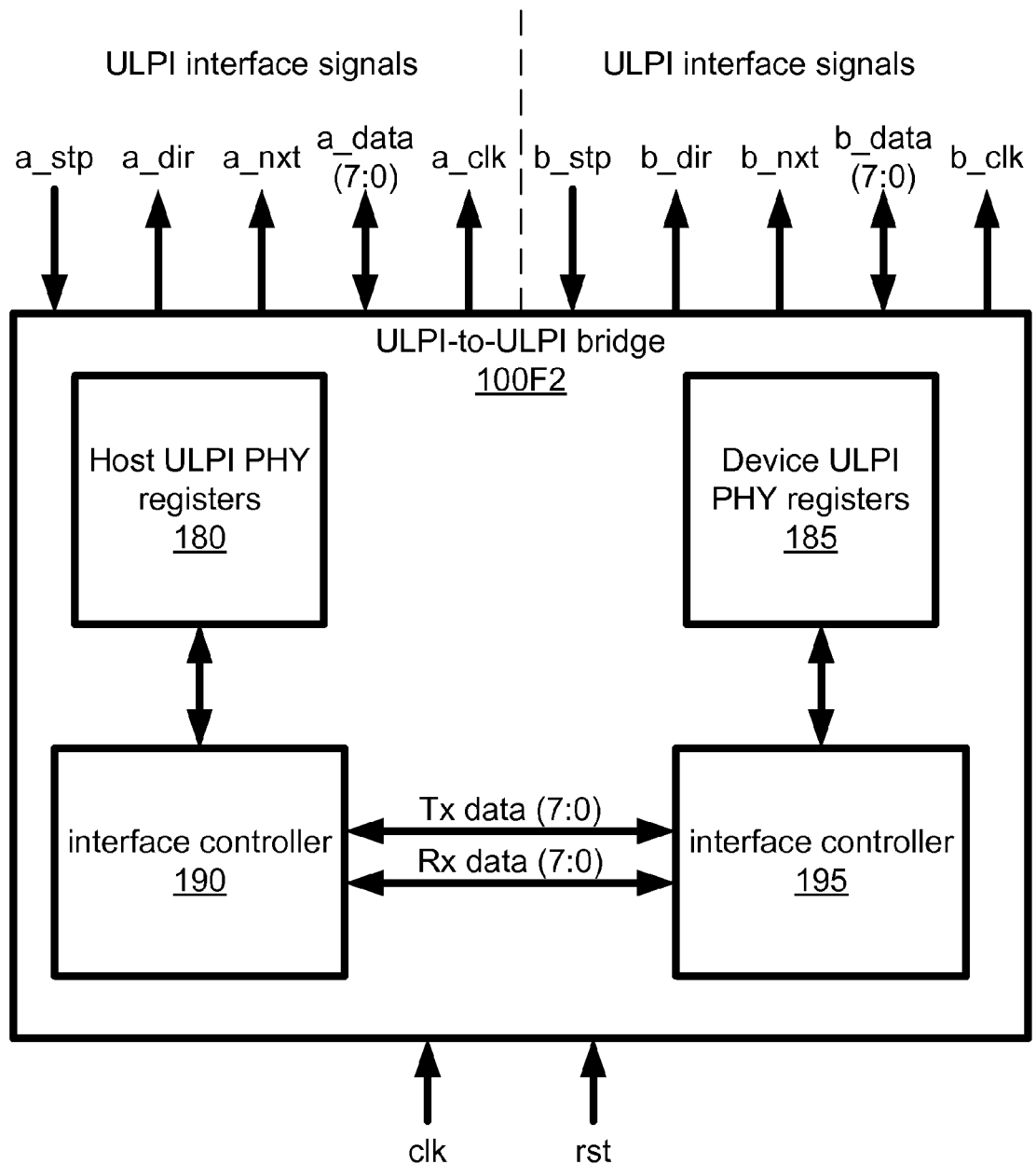
FIG. 9 shows a native ULPI-to-ULPI bridge core without the use of ULPI wrappers or UTMI-to-UTMI bridging, in accordance with embodiments of the present invention.

FIG. 9 shows a native ULPI-to-ULPI bridge core without the use of ULPI wrappers or UTMI-to-UTMI bridging, in accordance with embodiments of the present invention. As shown, the core bridge 100F2 is a native ULPI-to-ULPI bridge without the use of one or more ULPI wrappers on either end (or on both ends). This bridge also emulates actual PHY functionality, including: (1) ULPI PHY register read and write accesses; and (2) transmit and receive without actually having to go through D+/D− on the USB wires; which make this bridge ideal for chip-to-chip interconnect in a mobile device when both USB devices have inherent ULPI interfaces. The advantage to this bridge over the aforementioned ULPI-to-ULPI bridge 100F1 in FIG. 8 is the omission of the one or more ULPI Wrappers. By natively or inherently integrating the ULPI protocol logic internally in this bridge, we can eliminate the ULPI wrappers which can cause additional latencies to data and logic transfer resulting in possible decreased performance throughput and efficiencies.

Figure 10:
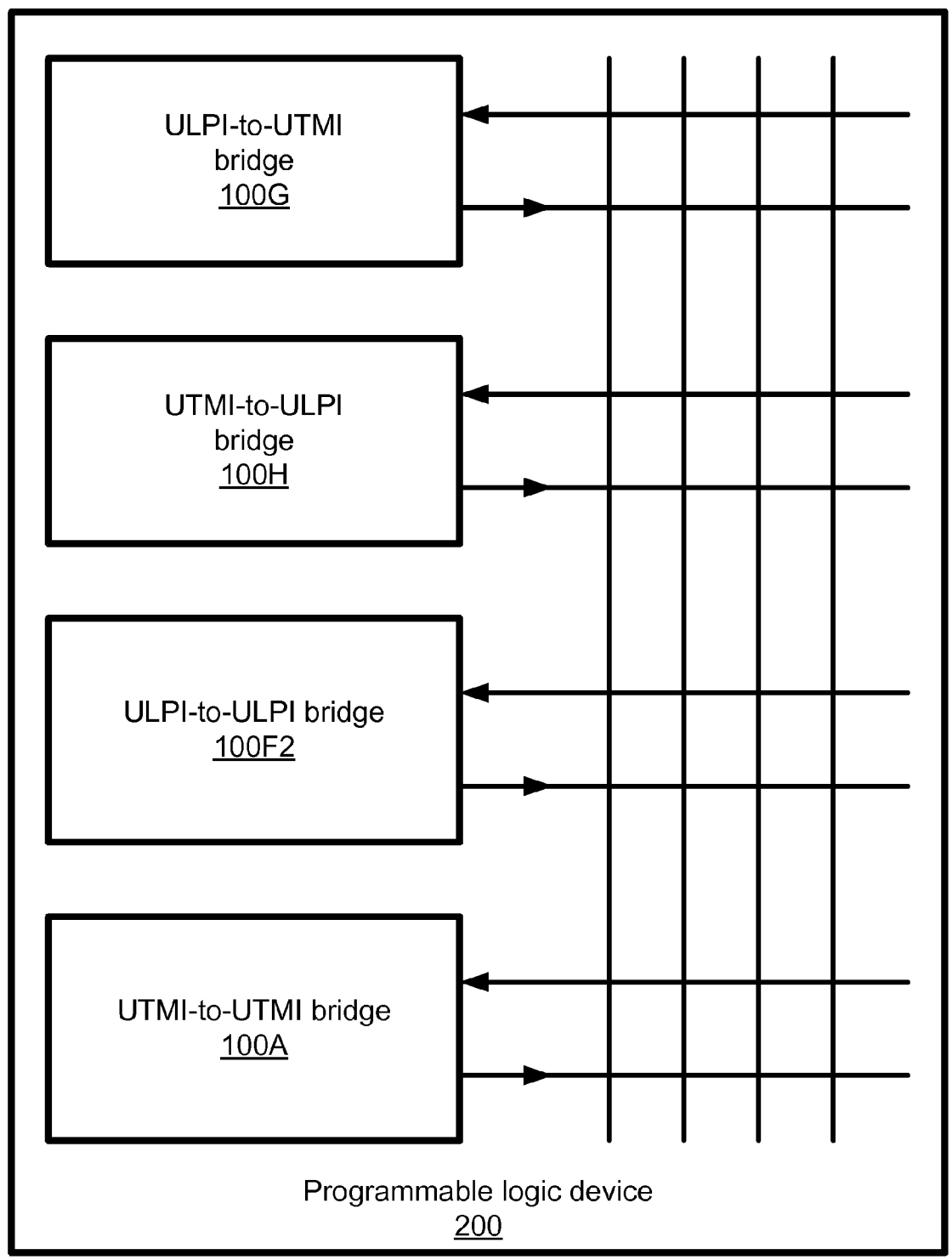
FIG. 10 shows a programmable logic device including multiple user-configurable bridges, in accordance with embodiments of the present invention.

FIG. 10 shows a programmable logic device 200 including multiple user-configurable bridges 100A, 100F2, 100H and 100G, in accordance with embodiments of the present invention. A programmable logic device 200 may include programmable interconnections (such as an antifuse grid) to allow a user to integrate a device module with a host module. For example, a user may program the logic device 200 to couple: (1) a UTMI host and a UTMI device using UTMI-to-UTMI bridge 100A; (2) a ULPI host and a ULPI device using ULPI-to-ULPI bridge 100F2; (3) a UTMI host and a ULPI device using UTMI-to-ULPI bridge 100H; or (4) a ULPI host and a UTMI device using ULPI-to-UTMI bridge 100G.

The description above provides various hardware embodiments of the present invention. Furthermore, the figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the claims. The description is not intended to be exhaustive or to limit the invention to the precise form disclosed. It should be understood that the invention can be practiced with modification and alteration.

What is claimed is:

1. A programmable logic device comprising:
a bridge to operate between a first USB (Universal Serial Bus) unit and a second USB unit, wherein the bridge is configurable to emulate a physical layer between the first USB unit and the second USB unit;
programmable logic;
a first physical interface coupled, via the programmable logic, to the first USB unit and to the bridge; and
a second physical interface coupled, via the programmable logic, to the second USB unit and to the bridge.

2. The programmable logic device of claim 1, wherein:
the first USB unit comprises a USB host; and
the second USB unit comprises a USB device.

3. The programmable logic device of claim 1, wherein:
the first USB unit comprises a first OTG (On-The-Go) USB device; and
the second USB unit comprises a second OTG USB device.

4. The programmable logic device of claim 1, wherein the bridge for UTMI (Universal Transceiver Macrocell Interface) comprises a UTMI-to-UTMI host/device bridge.

5. The programmable logic device of claim 1, wherein the bridge for UTMI (Universal Transceiver Macrocell Interface) comprises a UTMI-to-UTMI OTG (On-The-Go) bridge.

6. The programmable logic device of claim 1, wherein the bridge for ULPI (UTMI (Universal Transceiver Macrocell Interface)+Low Pin Interface) comprises a ULPI-to-ULPI bridge without a wrapper.

7. The programmable logic device of claim 1, wherein the bridge for ULPI (UTMI (Universal Transceiver Macrocell Interface)+Low Pin Interface) comprises a ULPI-to-ULPI bridge comprising:
a first interface controller;
a second interface controller coupled to the first interface controller through a physical interface;
host ULPI PHY (physical layer) registers coupled to the first interface controller; and
device ULPI PHY registers coupled to the second interface controller.

8. The programmable logic device of claim 7, wherein the physical interface between the first interface controller and the second interface controller comprise two eight-bit data buses.

9. The programmable logic device of claim 1, wherein:
the first physical interface comprises circuitry to operate with a first set of ULPI (UTMI (Universal Transceiver Macrocell Interface)+Low Pin Interface) interface signals; and
the second physical interface comprises circuitry to operate with a second set of ULPI interface signals; and
each of the first and second set of ULPI interface signals comprises
a stop signal;
a direction signal;
a next signal;
data signals; and
a clock signal.

10. The programmable logic device of claim 1, further comprising a ULPI-UTMI wrapper comprising:
a ULPI (UTMI+Low Pin Interface) upstream wrapper;
host ULPI PHY (physical layer) registers coupled to the ULPI upstream wrapper;
UTMI (Universal Transceiver Macrocell Interface) interface signals coupled to the bridge; and
ULPI interface signals coupled to the first USB unit.

11. The programmable logic device of claim 1, further comprising a ULPI-UTMI wrapper comprising:
a ULPI (UTMI+Low Pin Interface) downstream wrapper;
device ULPI PHY (physical layer) registers coupled to the ULPI downstream wrapper;
UTMI (Universal Transceiver Macrocell Interface) interface signals coupled to the bridge; and
ULPI interface signals coupled to the first USB unit.

12. The programmable logic device of claim 11, wherein the ULPI-UTMI wrapper comprises at least one state machine to drive a ULPI signal protocol for handling UTMI signals.

13. A programmable logic device comprising:
bridging means for
operating between a first USB (Universal Serial Bus) unit and a second USB unit; and
emulating a physical layer between the first USB unit and the second USB unit;
programmable logic means for coupling circuitry together;
a first interface means for coupling, via the programmable logic means, to the first USB unit and to the bridge; and
a second interface means for coupling, via the programmable logic means, to the second USB unit and to the bridge.

14. The programmable logic device of claim 13, wherein the bridging means comprises a bridging means for coupling UTMI (Universal Transceiver Macrocell Interface) interface signals from the first USB unit to UTMI interface signals from the second USB unit.

15. The programmable logic device of claim 13, further comprising a means for coupling the bridge to a wrapper.

16. A method in a programmable logic device, the method comprising:
providing a bridge;
providing programmable logic;
providing a first USB (Universal Serial Bus) unit;
providing a second USB unit;
programming the programmable logic to electrically couple the first USB unit to the bridge; and
programming the programmable logic to electrically couple the second USB unit to the bridge;
wherein the bridge is configurable to emulate a physical layer between the first USB unit and the second USB unit.

17. The method of claim 16, further comprising:
emulating a USB PHY (physical layer) interface signals between the first USB unit and the second USB unit using UTMI (Universal Transceiver Macrocell Interface) interface signals to the first USB unit.

18. The method of claim 16, further comprising:
emulating a USB PHY (physical layer) interface signals between the first USB unit and the second USB unit using ULPI (UTMI (Universal Transceiver Macrocell Interface)+Low Pin Interface) interface signals to the first USB unit.

19. The method of claim 16, wherein the acts of programming comprise emulating a physical layer between the first USB unit and the second USB unit.

* * * * *